US012263363B2

(12) United States Patent
Frejd

(10) Patent No.: US 12,263,363 B2
(45) Date of Patent: Apr. 1, 2025

(54) AIR RESPIRATOR ACCESSORY HAVING A BATTERY CONNECTOR PLUG WITH AN UNPLUG LEVER

(71) Applicant: 3M INNOVATIVE PROPERTIES COMPANY, St. Paul, MN (US)

(72) Inventor: Jonas N. A. Frejd, Falun (SE)

(73) Assignee: 3M Innovative Properties Company, St. Paul, MN (US)

( * ) Notice: Subject to any disclaimer, the term of this patent is extended or adjusted under 35 U.S.C. 154(b) by 980 days.

(21) Appl. No.: 17/283,404

(22) PCT Filed: Oct. 22, 2019

(86) PCT No.: PCT/IB2019/059006
§ 371 (c)(1),
(2) Date: Apr. 7, 2021

(87) PCT Pub. No.: WO2020/084482
PCT Pub. Date: Apr. 30, 2020

(65) Prior Publication Data

US 2021/0339059 A1 Nov. 4, 2021

(30) Foreign Application Priority Data

Oct. 26, 2018 (EP) .................................... 18202731

(51) Int. Cl.
*F04D 25/06* (2006.01)
*A62B 18/00* (2006.01)
(Continued)

(52) U.S. Cl.
CPC ............ *A62B 18/006* (2013.01); *A62B 18/08* (2013.01); *F04D 25/0673* (2013.01); *F04D 25/0693* (2013.01); *F04D 29/703* (2013.01)

(58) Field of Classification Search
CPC ............ F04D 25/0673; F04D 25/0693; F04D 29/703; F04D 29/601; F04D 25/06;
(Continued)

(56) References Cited

U.S. PATENT DOCUMENTS 2,507,092 A * 5/1950 Cline ................ H01R 13/6335 439/484
7,178,932 B1 * 2/2007 Buckman ................ A61F 9/068 362/373
(Continued)

FOREIGN PATENT DOCUMENTS

CA 2 166 819 A 7/1996
CN 202004267 U 10/2011
(Continued)

OTHER PUBLICATIONS

MachinetranslationJP2002124342; translation of JP 2002 124342A, Escapenet.com, retrieved Mar. 8, 2024, total 2 pages. (Year: 2002).*
(Continued)

*Primary Examiner* — Philip E Stimpert
*Assistant Examiner* — Dnyanesh G Kasture

(57) ABSTRACT

A system which is composed of a blower unit for a powered air purifying respirator and an electrically powered accessory. The blower unit has a blower device and a battery for powering the blower device. And the accessory is equipped with a power connector. The blower unit provides a power outlet for connection with the power connector. The power connector has a plug. Furthermore the power connector has an unplug lever for retracting the plug for unplugging. The unplug lever and the plug are connected by a pivot joint that forms a pivot axis. The unplug lever forms a handle arm and a counter arm that extend away from the pivot joint in opposite directions.

12 Claims, 4 Drawing Sheets

(51) Int. Cl.
*A62B 18/08* (2006.01)
*F04D 29/70* (2006.01)

(58) Field of Classification Search
CPC ... F04D 25/0606; F04D 25/08; A62B 18/006; A62B 18/08; A62B 18/045; H01R 13/635; H01R 35/00; H01R 35/025; A61F 9/06; F16P 1/00; F16P 1/06; A61M 16/0057; A61M 16/006; A61M 16/0063; A61M 16/0066; A61M 5/14244
USPC ........................................................... 417/234
See application file for complete search history.

(56) References Cited

U.S. PATENT DOCUMENTS

| | | | | |
|---|---|---|---|---|
| 7,248,903 | B2 * | 7/2007 | Yoda | H05K 1/028<br>455/575.1 |
| 7,357,135 | B2 * | 4/2008 | Cunningham | A62B 17/04<br>128/201.29 |
| 7,462,060 | B2 | 12/2008 | Hamoignon | |
| 9,481,424 | B2 * | 11/2016 | Hagen | A62B 18/006 |
| 11,185,722 | B2 | 11/2021 | Sernfalt et al. | |
| 2012/0246809 | A1 | 10/2012 | Elam et al. | |
| 2017/0215509 | A1 | 8/2017 | Dutour et al. | |
| 2018/0256925 | A1 * | 9/2018 | Sommers | A42B 3/225 |
| 2021/0294391 | A1 | 9/2021 | Silvanto et al. | |

FOREIGN PATENT DOCUMENTS

| | | | | |
|---|---|---|---|---|
| CN | 103199400 | | 7/2013 | |
| DE | 4214016 | | 11/1993 | |
| DE | 10261602 | | 7/2004 | |
| FR | 840623 | | 4/1939 | |
| GB | 2109246 | | 6/1983 | |
| JP | 2002-124342 A | | 4/2002 | |
| JP | 2002124342 | * | 4/2002 | H01R 13/46 |
| KR | 20100105607 A | * | 9/2010 | A62B 18/006 |

OTHER PUBLICATIONS

Machine Translation of Chinese Patent CN 202002467 U to Li, retrieved from espacenet on Jul. 25, 2024 (Year: 2024).*

Machine Translation of Korean Patent KR 20100105607 A to Tilley, retrieved from espacenet on Jul. 25, 2024 (Year: 2024).*

International Search Report for PCT International Application No. PCT/IB2019/059006, mailed on Jan. 17, 2020, 4 pages.

Search Report for China Appl. No. 2019800705431, mailed on Oct. 25, 2021, 3 pp.

Sernfält et al., U.S. Pat. No. 10,994,158 B2, titled Heating for Powered Air Unit, Date of Patent: May 4, 2021.

* cited by examiner

AIR RESPIRATOR ACCESSORY HAVING A BATTERY CONNECTOR PLUG WITH AN UNPLUG LEVER

FIELD OF THE INVENTION

The invention relates to a system which comprises a battery powered blower unit for a powered air purifying respirator (PAPR) and an electrically powered accessory. In more particular the invention relates to a power connector of the accessory which may be connected to a power outlet of the blower unit.

BACKGROUND ART

Workers working in atmospheres that can contain dusts, fumes, gases or other substances that are potentially hazardous or harmful to health often use a respirator. A common type of respirator is a powered air purifying respirator (PAPR).

PAPRs typically include a powered blower unit that is connected to a face piece via an air hose. The face piece is worn at least over the nose and mouth of the wearer, and the powered blower unit is commonly worn about the wearer's waist. The face piece may be a protective helmet, for example a multi-purpose protection helmet, or a grinding or welding helmet. The blower unit typically has a filter and an electric motor driven fan. The blower unit typically sucks in ambient air through the filter. The filter may be provided in the form of one or more exchangeable filter cartridges. The filtered air is delivered to the face piece through the air hose. The electrically powered fan draws air through the filter, through the air hose, and into the face piece interior. Because the fan urges the air toward the face piece by motor powered overpressure the wearer is able to comfortably receive a clean supply of air with little effort.

In some cases it is desirable to use an accessory, for example a headlamp or a radio device, in combination with the PAPR. Some accessories have a cable set for electrically connecting the accessory to a battery. The battery may be provided in the form of a separate device with means for carrying on a wearer's body. However it is desirable to minimize the devices a wearer needs to wear or carry in use of a PAPR and an accessory.

SUMMARY OF THE INVENTION

The invention relates to a system that comprises a blower unit for (or of) a powered air purifying respirator (further referred to as "PAPR"), and an electrically powered accessory. Accordingly, the system comprises the blower unit and further the electrically powered accessory.

The blower unit comprises a blower device and a battery for powering the blower device.

Further, the accessory has a power connector. The power connector preferably allows the accessory to be electrically connected to a battery or, according to the invention, to the blower unit. Furthermore the blower unit comprises a power outlet for connection with the power connector.

The power connector comprises a plug and an unplug lever. The unplug lever serves for retracting the plug for unplugging. In particular the unplug lever may be used for retracting the plug from the power outlet and thus for unplugging the plug from the power outlet.

The unplug lever and the plug are connected by a pivot joint. The pivot joint forms a pivot axis. The unplug lever and the plug are thus preferably pivotally connected to each other. Further, the unplug lever forms (or is formed of) a handle arm and a counter arm that extend away from the pivot joint in opposite directions.

The invention is advantageous in that it allows the accessory to be electrically connected to the PAPR. Thus there is no need for the wearer to carry a separate battery for the accessory, although it is still possible to connect the accessory to either a separate battery or the PAPR. Rather, the same battery can be used for powering the blower unit of the PAPR and for powering the accessory. Furthermore, the invention accommodates the power connector of the accessory between the wearer and the blower unit, when the blower unit is worn by the wearer. Thus the power connector is prevented from inadvertently being pulled off from the power outlet because it is captured between the wearer and the blower unit. Thus, further no additional means for securing the power connector to the blower unit are required. On the other hand the power connector is easily accessible and removable from the blower unit as the blower unit is put off by the wearer. Therefore if the PAPR is not in use the accessory can be freely connected to or disconnected from the blower unit without the need of unlocking or locking any additional means for securing the power connector. Further, the invention enables the power connector to be unplugged even when the blower unit is worn. This is because the power connector is furnished with the unplug lever that allows the power connector to be easily unplugged blindly by the wearer. Further due to a relatively high force provided by the unplug lever the power connector can be unplugged using the unplug lever although any forces as they typically occur during normal use of the PAPR typically are not sufficient to unplug the power connector, when arranged between the wearer and the blower unit.

In an embodiment the plug comprises at least one electrical contact. The power connector preferably comprises an electrical wire that is electrically connected to the electrical contact. The electrical wire may form a loop around the pivot axis. Further, the power connector may comprise a plurality of electrical wires that are each electrically connected to a one of a plurality of electrical contacts. The electrical wire(s) may form a loop around the pivot axis. For example the power connector may comprise a pin that forms the pivot and the electrical wire(s) may be looped around the pin. The loop may extend over at least 360 degrees. Thus the wire or wires is or are prevented from breaking as a result of frequently pivoting the plug and the unplug lever relative to each other. The wire or wires is/are preferably part of a cable set of the accessory. The accessory may be a headlamp or a radio device, for example.

In an embodiment the electrical wire extends through the handle arm. The handle arm may have a channel through which the electrical wire or the plurality of wires extend.

In an embodiment the handle arm has a first length in a dimension radially of the pivot axis and the counter arm has a second length in a dimension radially of the pivot axis. The first length is preferably greater than the second length. Thus, the length of handle arm relative to the length of the counter arm provide a maximized leverage effect. In particular the power connector is thus configured such that a pulling force applied to (or adjacent) a free end of the handle arm is leveraged to cause a greater unplugging force acting on the plug. The unplugging force is preferably oriented for retracting the plug from the power outlet. Further the unplugging force and the pulling force are preferably oriented parallel or essentially parallel to each other.

In an embodiment the unplug lever extends straight. In particular the unplug lever may extend along a longitudinal axis. For example the unplug lever may extend at a uniform or generally uniform cross-section along the longitudinal axis. A longitudinal dimension of the unplug lever along the longitudinal axis is preferably greater that a dimension perpendicular of the longitudinal axis. Therefore the unplug lever preferably has a flat configuration. Because of the flat configuration of the unplug lever the unplug lever can be conveniently accommodated between the blower unit and the wearer.

In an embodiment the plug is pivotable to a position in which the plug extends in a direction transverse to the unplug lever (and transverse to the longitudinal axis). Hence the plug and the unplug lever are preferably arrangeable or arranged in a T-configuration. However, in one embodiment the plug is pivotable to a position in which the plug extends in a direction that is in line with the unplug lever (I-configuration). The plug and the unplug lever may be further configured for pivoting between the T-configuration and the I-configuration.

In an embodiment the blower unit has a body facing side. The body facing side is a side of the blower unit that faces the body of a wearer who wears the blower unit. The power outlet preferably extends into the body facing side. In a situation in which the power connector is plugged into the power outlet, at least the counter arm (or the entire unplug lever) preferably bears flat on (or with the longitudinal axis parallel to) the body facing side.

In an embodiment the power outlet is provided by the battery. The battery may have a housing that forms at least a portion of the body facing side. The power outlet may extend into the housing. The power outlet may be formed by a charging port of the battery. Thus the charging port may form the power outlet and also a power inlet for charging the battery. Further, the power outlet may be one of two power outlets of the battery. The battery may have a first power outlet for powering the blower device, and the power outlet as described above may form a second power outlet. The second power outlet may be used for powering an accessory and for charging the battery.

In one embodiment the battery is removably connectable to the blower device. The battery may be removably connectable to the blower device by plugging in a dimension transverse to a direction in which the body facing side faces.

In an embodiment the blower unit, in particular the blower device, is belt-mounted. Therefore the blower unit or blower device is configured for being worn around a wearer's waist.

In an embodiment the blower device comprises a fan, a filter and an air outlet for connection of an air hose of a respirator face piece. The respirator face piece may be a welding helmet. Such a welding helmet may have an automatic darkening filter for blocking at least any potentially harmful part of light emitted from a welding arc.

In an embodiment the automatic darkening filter comprises a polarizers and one or more liquid crystal cells. The polarizers are preferably arranged in an overlapping manner on opposite sides of a liquid crystal cell. The liquid crystal cells may be each provided with a polarizer on both sides and only one polarizer between two liquid crystal cells.

The automatic darkening filter is preferably configured such that it can be electrically switched between a dark-state and a light-transmission-state. In the dark-state, the automatic darkening filter blocks a significant amount of light from being transmitted through the automatic darkening filter. This enables a wearer to observe a welding arc by seeing through the automatic darkening filter without risking to be exposed to harmful light radiation from the welding arc. In the light-transmission-state the automatic darkening filter permits a significant amount of light to be transmitted through the automatic darkening filter. Thus, the automatic darkening filter in the light-transmission-state allows the wearer to see under ambient light conditions (in the absence of the welding arc).

DETAILED DESCRIPTION OF THE INVENTION

Figure 1:
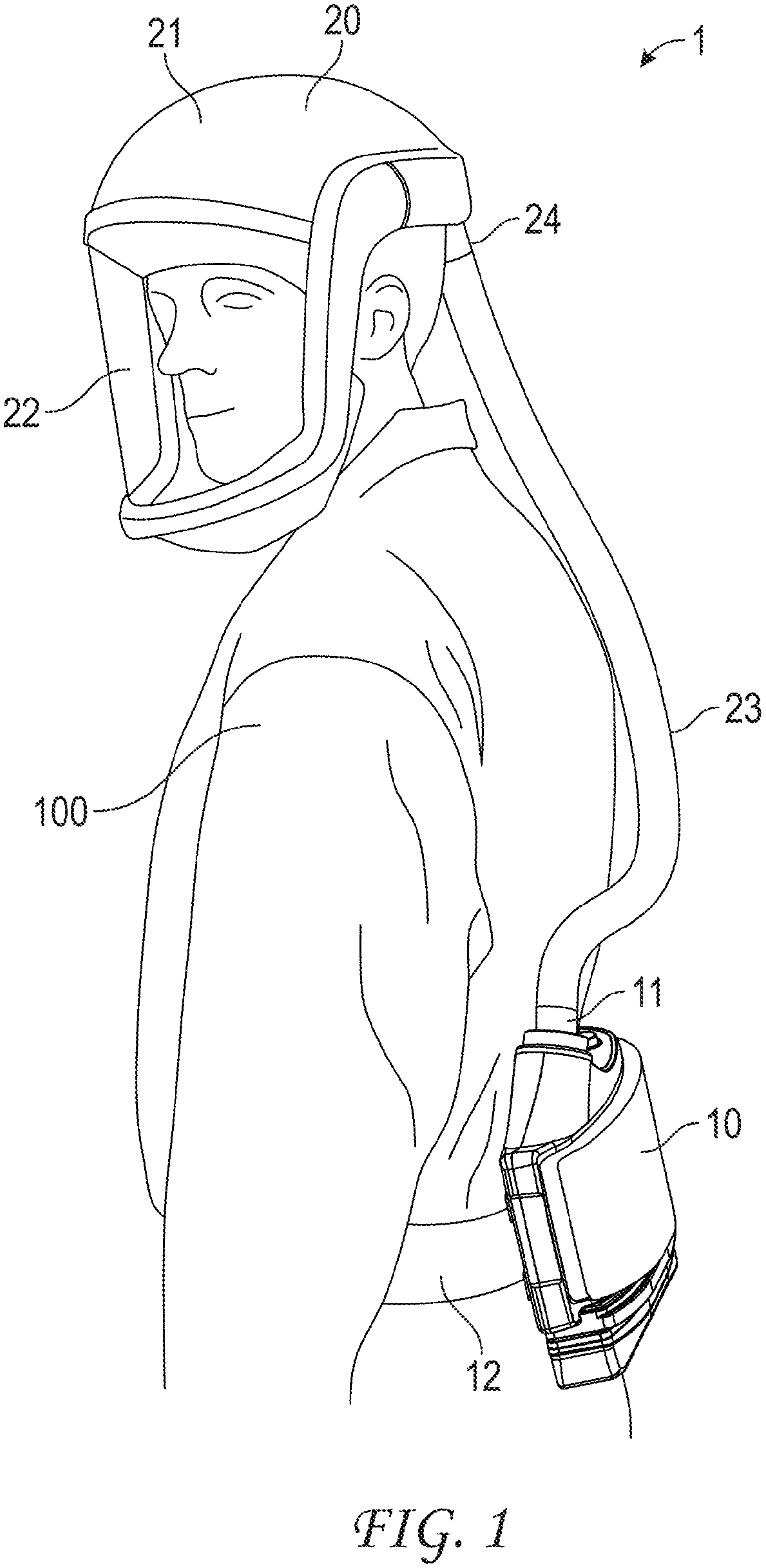
FIG. 1 is a perspective view of a powered air purifying respirator (PAPR) worn by a wearer according to an embodiment of the invention.

FIG. 1 shows a powered air purifying respirator (PAPR) 1 as it can be used with the invention. The PAPR 1 is worn by a wearer 100. The PAPR 1 has a battery powered blower unit 10 and a respirator face piece 20 in the form of helmet 21 that has a face shield 22. The blower unit 10 has an air outlet 11 connected to one end of an air hose 23. The other end of the air hose 23 is connected to an air inlet 24 of the respirator face piece 20.

The blower unit 10 is belt-mounted. Thus the blower unit 10 can be conveniently worn on the back of a wearer and can be retained at the wearer by a belt 12. Therefore the blower unit 10 can be worn by a wearer fixedly and hands-free.

In the example of FIG. 1 the face shield 22 is clear. Therefore the respirator face piece 20 shown may be used under normal light conditions. However, the respirator face piece 20 may be used in an atmosphere which contains substances that, without the respirator face piece 20 would be harmful for the health of the wearer, for example an atmosphere containing dust or fume.

Figure 2:
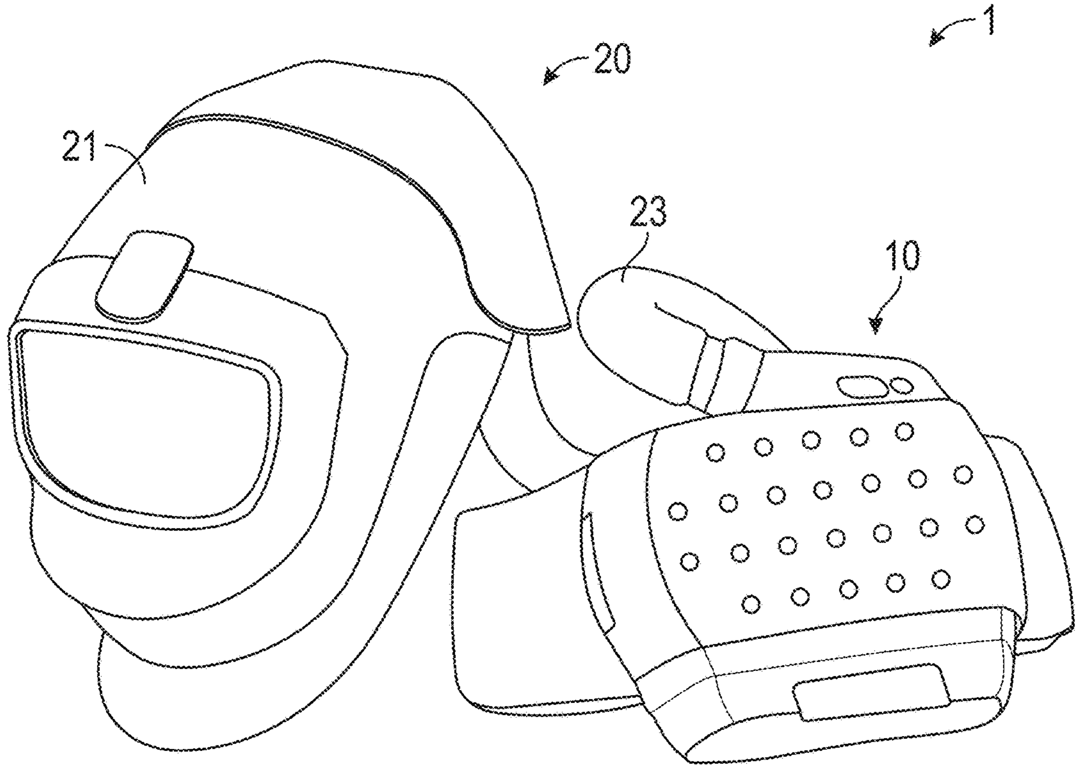
FIG. 2 is a perspective view of a PAPR according to another embodiment of the invention.

FIG. 2 shows a respirator face piece 20 in the form of a welding helmet 21. The welding helmet 21 is connected (via an air hose 23) to a battery powered blower unit 10 that is technically identical to the battery powered blower unit 10 of FIG. 1. The respirator face piece 20 shown in FIG. 2 and the battery powered blower unit 10 in combination form a powered air purifying respirator (PAPR) 1.

The welding helmet 21 in the example comprises an automatic darkening filter. Such an automatic darkening filter is preferably based on one or more liquid crystal cells that can be electrically switched between a dark-state and a light-transmission-state, as described above.

Figure 3:
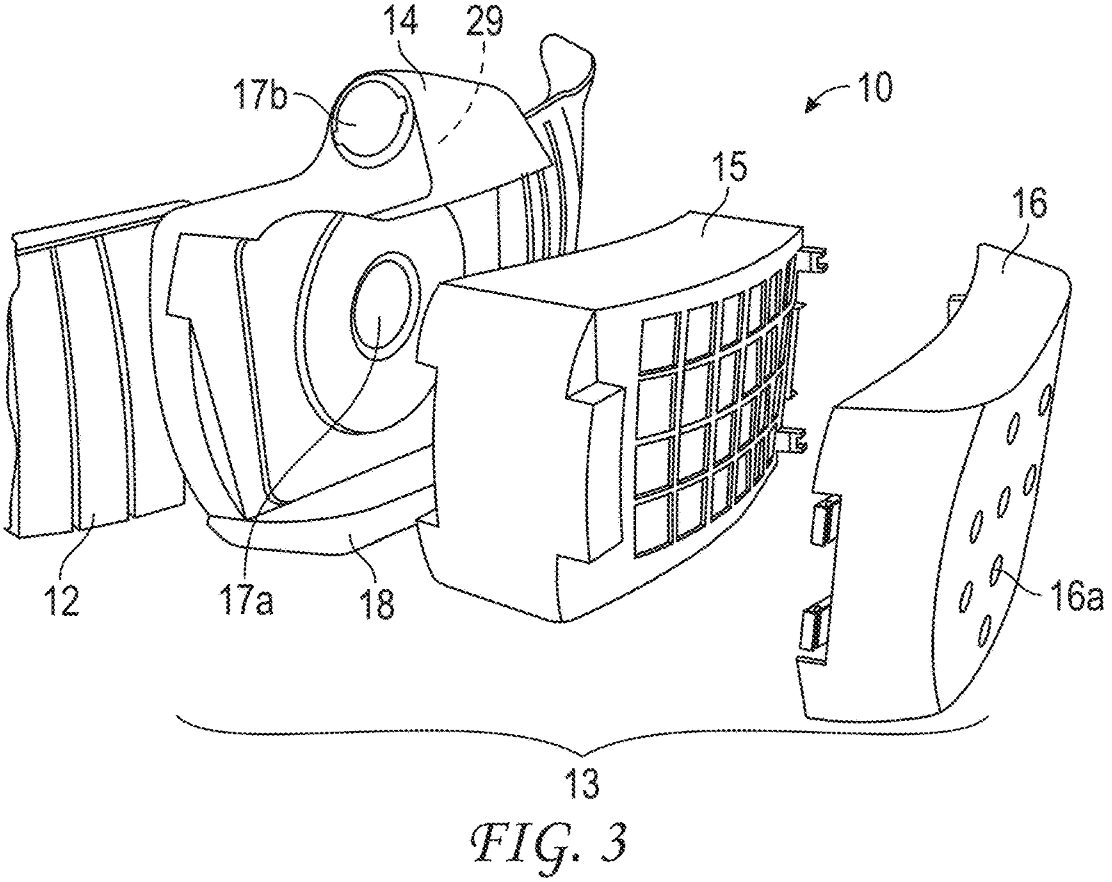
FIG. 3 is a perspective exploded view of a blower unit of a PAPR according to an embodiment of the invention.

FIG. 3 shows the blower unit 10 in more detail. As described, the blower unit 10 may be used with various types of respirator face pieces as for example shown in FIGS. 1 and 2.

The blower unit 10 has a blower device 13 that in the example has a blower housing 14, a filter cartridge 15 and an optional cover 16. The blower housing 14 includes an electrically powered fan 29 (not visible) and an air channel that extends between in an air inlet **17*a* and an outlet 17*b***.

An air hose (23 in FIG. 2) may be installed to the blower device 13 via the air outlet 17*b*. An air inlet 17*b* is covered by the filter cartridge 15 so that air sucked into the blower housing 14 is forced to flow through the filter cartridge 15. Thereby any potentially harmful particles and/or droplets from dust or fumes are retained within the filter cartridge 15 so that the blower device 10 provides clean air to the wearer.

The cover 16 is optional and in the example covers an air entry side of the filter cartridge 15. Thus the filter cartridge 15 is protected against mechanical impacts while the cover 16 permits air to pass through via a perforation 16*a*.

The blower unit 10 further has a battery 18 which is electrically connected to the blower device 13 for powering the fan.

Figure 4:
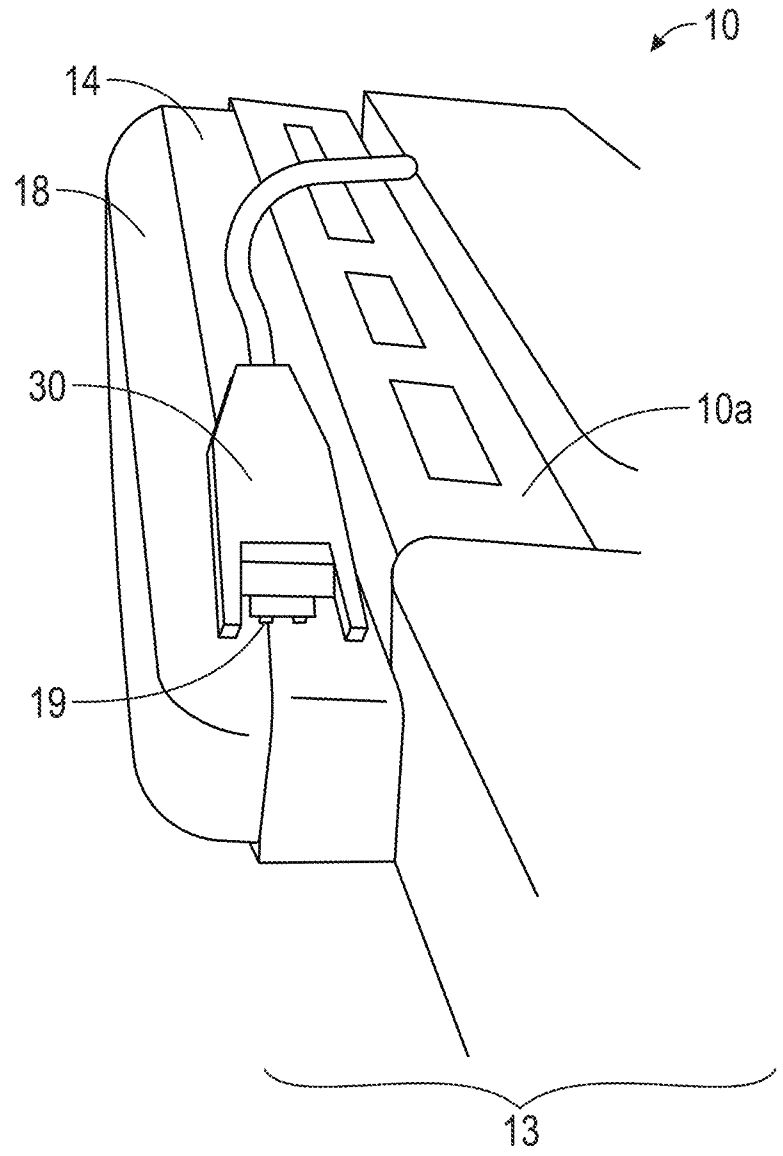
FIG. 4 is a perspective detail view of a blower unit of a PAPR according to an embodiment of the invention.

As illustrated in FIG. 4 the blower unit 10 comprises a power outlet 19. In the example a power connector 30 of an electrically powered accessory, for example a headlamp (not shown), is plugged into the power outlet 19. The blower unit 10 in particular has a body facing side 10*a*. The body facing side 10*a* is that side of the blower unit 10 that faces the body of a wearer who wears the blower unit 10. The power outlet 19 is arranged on (or within) the body facing side 10*a*. Therefore the power connector 30 is arranged between the body of the wearer and the blower unit 10, when the blower unit 10 is worn by the wearer. Thus, the power connector 30 is prevented from unplugging during use of the PAPR. This is because the power connector 30 is enclosed between the wearer and the blower unit and therefore cannot move for unplugging. On the other hand, once the blower unit is put off by the wearer the power connector 30 can be easily unplugged.

In the example the body facing side 10*a* is partially provided by the blower device 13, in particular by the blower housing 14, and partially by the battery 18. However, in other examples the body facing side may be entirely provided by the blower device 13, in particular by the blower housing 14, or—alternatively—by the battery 18.

Figure 5:
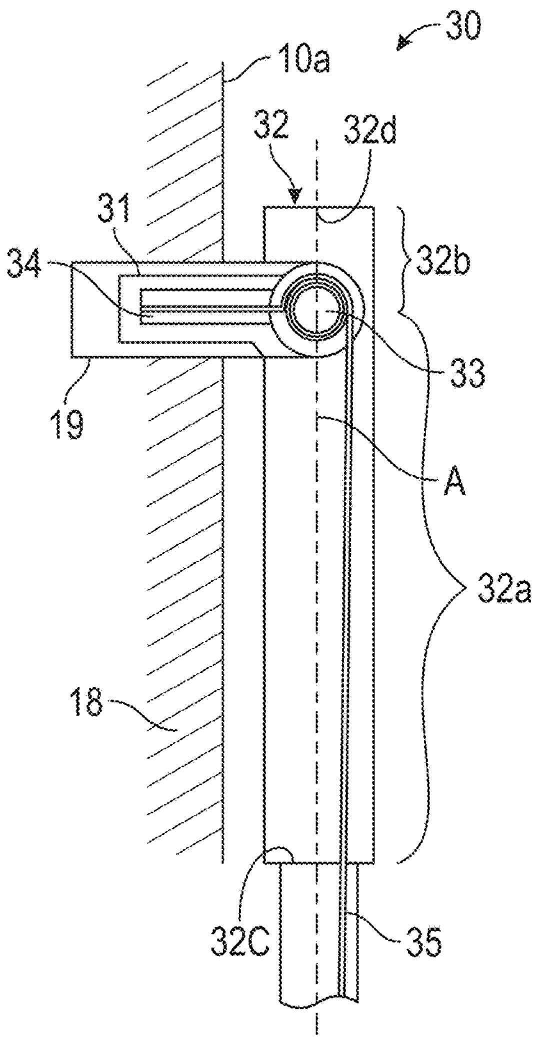
FIG. 5 is a cross-sectional view of a power connector at one stage of use according to an embodiment of the invention.
Figure 6:
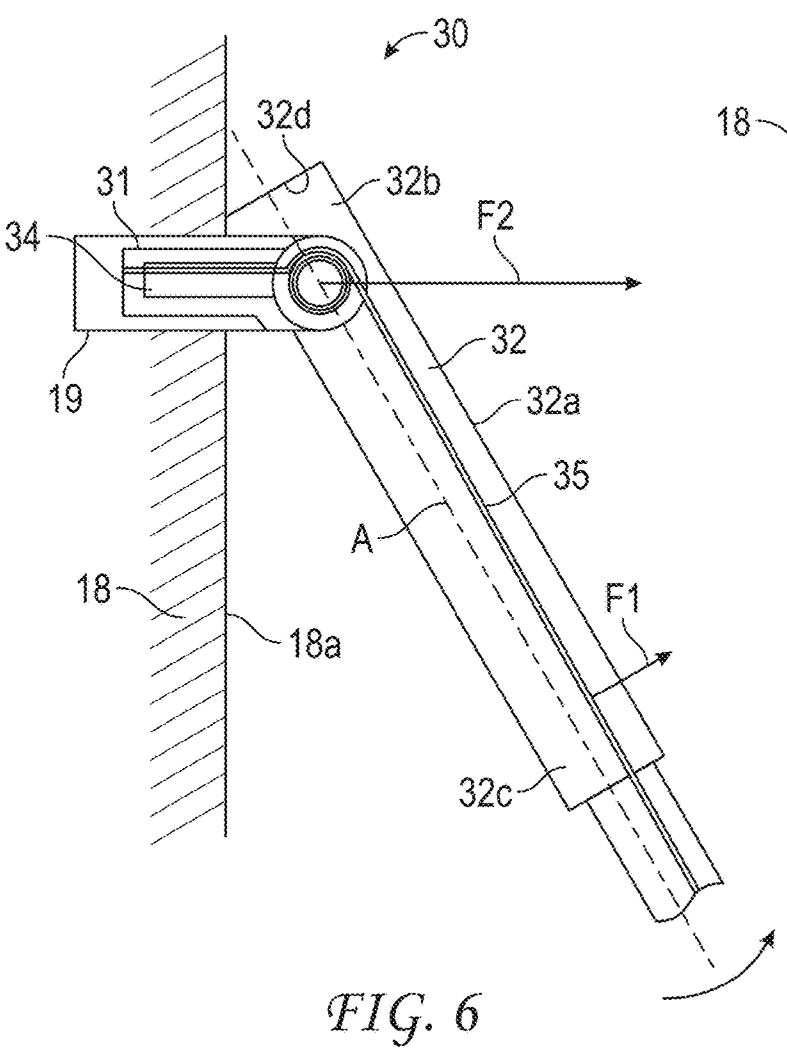
FIG. 6 is a cross-sectional view of a power connector at another stage of use a according to an embodiment of the invention.

FIGS. 5 and 6 show the power connector 30 in more detail. The power connector 30 comprises a plug 31 and an unplug lever 32. The unplug lever 32 and the plug 31 are pivotally connected with each other. A pivot axis 33 is formed by the pivotal connection between the plug 31 and the unplug lever 32. The unplug lever 32 is formed of a handle arm 32*a* and a counter arm 32*b*. The handle arm 32*a* extends from the pivot axis 33 to a first free end 32*c* of the handle arm 32*a*, and the counter arm 32*b* extends from the pivot axis 33 to an opposite second free end 32*d*. In the example the unplug lever 32 extends straight along a longitudinal axis A. Further, the unplug lever 32 is flat in a direction perpendicular to the longitudinal axis A. FIG. 5 shows the power connector 30 plugged into the power outlet 19 of the blower unit.

In the example the power outlet 19 is formed within the battery 18. In the situation in which the power connector 30 is fully plugged into the power outlet 19 the unplug lever 32 abuts (or nearly abuts) the body facing side 10*a* (in the example a partial surface of the battery 18) over its entire length. In other words, in this situation the unplug lever 32 is arranged parallel to the body facing side 10*a*.

For unplugging the power connector 30, the handle arm 32*a* of the unplug lever 32 can be pulled away from the body facing side 10*a* so that the unplug lever 32—rotating about the pivot axis 33—causes the counter arm 32*b* to be pressed against the body facing side 10*a*.

This is illustrated in FIG. 6. As a consequence the plug 31 is pulled away from the power outlet 19 and thus is finally unplugged from the power outlet 19. Due to the greater length of the handle arm 32*a* in relation to the shorter length of the counter arm 32*b*, an unplugging force F2 exerted on the plug 31 for unplugging is greater than a pulling force F1 exerted to the handle arm 32*a*. Therefore the handle arm 32*a* allows the plug 31 to be retracted at a minimized pulling force F1.

The power connector 30 further comprises one or more electrical contacts 34 which are electrically connected to a wire 35 of a cable set of an electrically powered accessory (not shown). The wire 35 is arranged within the handle arm 32*a* and is looped around the pivot axis 33. The loop of the wire extends over at least 360 degrees. Thus the wire is prevented from breaking in consequence of pivoting the unplug lever 32 and the plug 31 relative to each other.

The invention claimed is:

1. A system comprising a blower unit for a powered air purifying respirator, and an electrically powered accessory, wherein the blower unit comprises a blower device and a battery, wherein the accessory has a power connector, and wherein the blower unit comprises a power outlet for connection with the power connector such that the battery is used to power the blower device and the electrically powered accessory, the power connector comprising a plug and further an unplug lever for retracting the plug for unplugging, the unplug lever and the plug being connected by a pivot joint forming a pivot axis, wherein the plug comprises at least one electrical contact and the power connector further comprises at least one electrical wire that is electrically connected to the electrical contact, wherein the electrical wire forms a loop around the pivot axis;

wherein the unplug lever forms a handle arm and a counter arm extending away from the pivot joint in opposite directions, and wherein the blower unit has a body facing side which is a side that faces the body of a wearer who wears the blower unit, wherein the power outlet extends into the body facing side, and wherein in a situation in which the power connector is plugged into the power outlet, the unplug counter arm bears flat on the body facing side and the plug and the unplug lever are arranged in a T-configuration such that the plug extends from the pivot axis into the power outlet to accommodate the power connector of the accessory between the wearer and the blower unit.

2. The system of claim 1, wherein the electrical wire extends through the handle arm.

3. The system of claim 1, wherein the handle arm has a first length in a dimension radially of the pivot axis and the counter arm has a second length in a dimension radially of the pivot axis, and wherein the first length is greater than the second length.

4. The system of claim 1, wherein the unplug lever extends straight.

5. The system of claim 4, wherein the plug is pivotable to a position in which the plug extends in a direction transverse to the unplug lever.

6. The system of claim 1, wherein the power outlet is provided by the battery.

7. The system of claim 6, wherein the battery has a housing that forms at least a portion of the body facing side, and wherein the power outlet extends into the housing.

8. The system of claim 1, wherein the battery is removably connectable to the blower device by plugging in a dimension transverse to a direction in which the body facing side faces.

9. The system of claim 1, wherein the accessory is a headlamp.

10. The system of claim 1, wherein the blower device is belt-mounted.

11. The system of claim 1, wherein the blower device comprises a fan, a filter and an air outlet for connection of an air hose.

12. The system of claim 11, wherein the system further comprises a respirator face piece, wherein the air hose connects the respirator face piece to the air outlet of the blower device.

* * * * *